US008010167B2

(12) United States Patent
Cotevino et al.

(10) Patent No.: US 8,010,167 B2
(45) Date of Patent: Aug. 30, 2011

(54) NETWORK CALL MANAGEMENT IN CASE OF LOW BATTERY CONDITION OF MOBILE COMMUNICATIONS TERMINALS

(75) Inventors: Agostino Cotevino, Turin (IT); Ivano Camerano, Turin (IT)

(73) Assignee: Telecom Italia S.p.A., Milan (IT)

( * ) Notice: Subject to any disclaimer, the term of this patent is extended or adjusted under 35 U.S.C. 154(b) by 705 days.

(21) Appl. No.: 11/793,685

(22) PCT Filed: Dec. 24, 2004

(86) PCT No.: PCT/EP2004/053706
§ 371 (c)(1),
(2), (4) Date: May 13, 2008

(87) PCT Pub. No.: WO2006/066631
PCT Pub. Date: Jun. 29, 2006

(65) Prior Publication Data
US 2008/0311961 A1 Dec. 18, 2008

(51) Int. Cl.
H04M 1/00 (2006.01)
G08C 17/00 (2006.01)
(52) U.S. Cl. ...................... 455/574; 370/311
(58) Field of Classification Search .......... 455/572–574, 455/466, 418–420, 500, 412.2, 412.1, 343.2, 455/343.5, 343.6, 414.4, 517–519, 456.1, 455/456.5, 456.3, 456.6; 370/311–312
See application file for complete search history.

(56) References Cited

U.S. PATENT DOCUMENTS

| 6,072,784 | A | 6/2000 | Agrawal et al. | |
|---|---|---|---|---|
| 6,236,326 | B1 | 5/2001 | Murphy | |
| 6,408,172 | B1 | 6/2002 | Alperovich et al. | |
| 6,704,583 | B1* | 3/2004 | Yoshioka | 455/574 |
| 7,099,693 | B2* | 8/2006 | Shin | 455/557 |
| 7,251,505 | B2* | 7/2007 | Shin et al. | 455/567 |
| 7,583,958 | B2* | 9/2009 | Coskun et al. | 455/414.4 |
| 7,756,531 | B2* | 7/2010 | Aminzadeh | 455/456.4 |
| 2002/0128051 | A1* | 9/2002 | Liebenow | 455/574 |
| 2004/0204183 | A1* | 10/2004 | Lencevicius et al. | 455/574 |
| 2004/0242213 | A1* | 12/2004 | Benco et al. | 455/415 |
| 2005/0085277 | A1* | 4/2005 | Chen et al. | 455/572 |
| 2005/0233780 | A1* | 10/2005 | Jani et al. | 455/574 |
| 2006/0121951 | A1* | 6/2006 | Perdomo et al. | 455/572 |

FOREIGN PATENT DOCUMENTS

| EP | 0 915 632 | A2 | 5/1999 |
|---|---|---|---|
| EP | 1 215 927 | B1 | 6/2002 |
| EP | 1 439 725 | B1 | 7/2004 |
| WO | WO 98/10610 | * | 3/1998 |
| WO | WO 98/10610 | A1 | 3/1998 |
| WO | WO 98/26622 | A2 | 6/1998 |
| WO | WO 03/053085 | A1 | 6/2003 |

* cited by examiner

Primary Examiner — Brandon J Miller
(74) Attorney, Agent, or Firm — Finnegan, Henderson, Farabow, Garrett & Dunner, L.L.P.

(57) ABSTRACT

In a mobile communications system which includes a mobile communications network and a battery-powered mobile communications terminal, a method including: receiving, at a mobile communications network apparatus subsystem, a notification of a low battery charge condition from the battery-powered mobile communications terminal, and having the mobile communications network apparatus subsystem inform at least one second user, different from a first user using the battery-powered mobile communications terminal, based on the received notification.

23 Claims, 6 Drawing Sheets

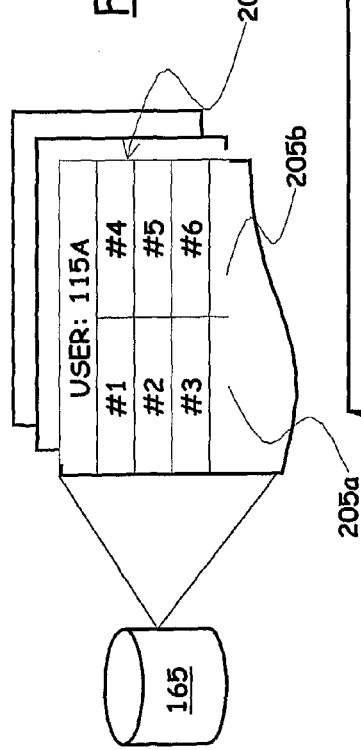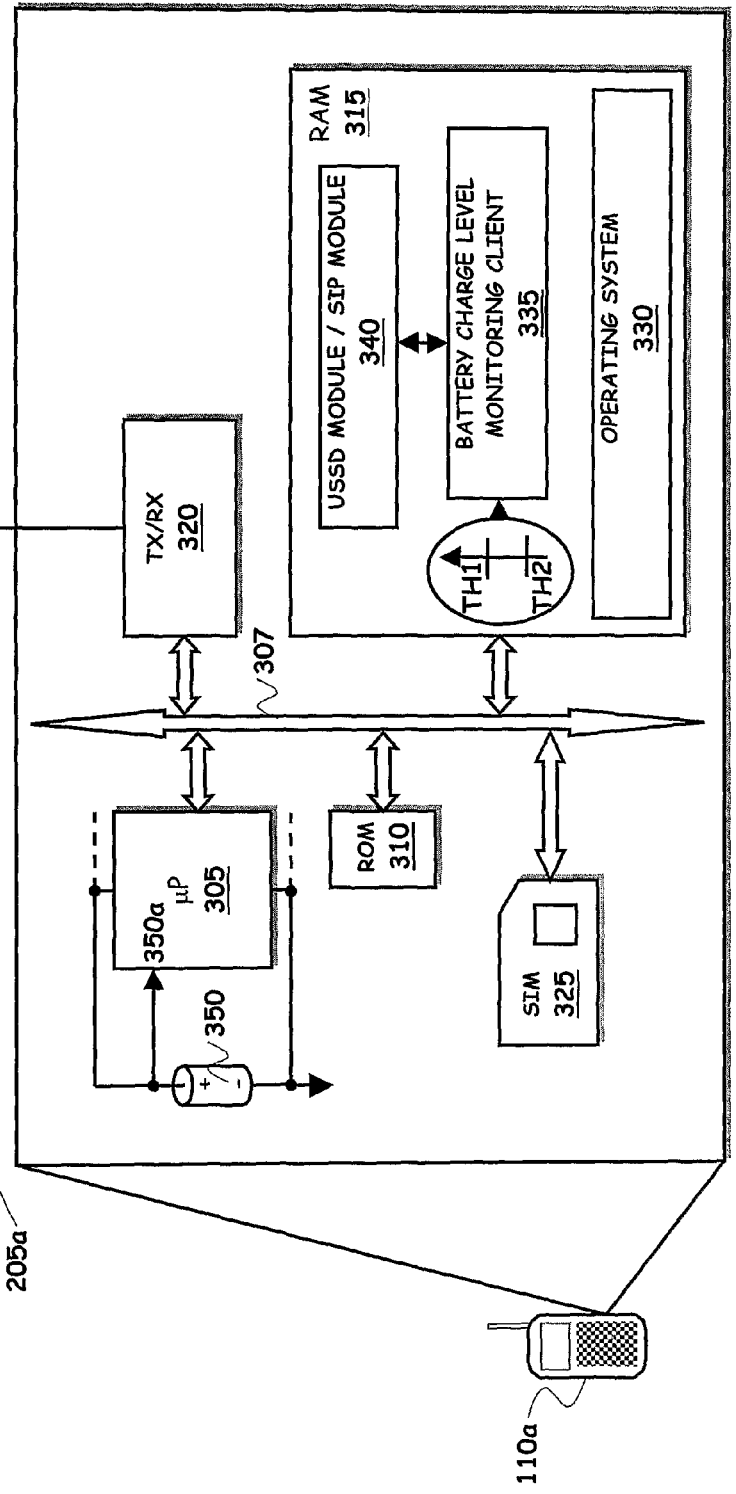

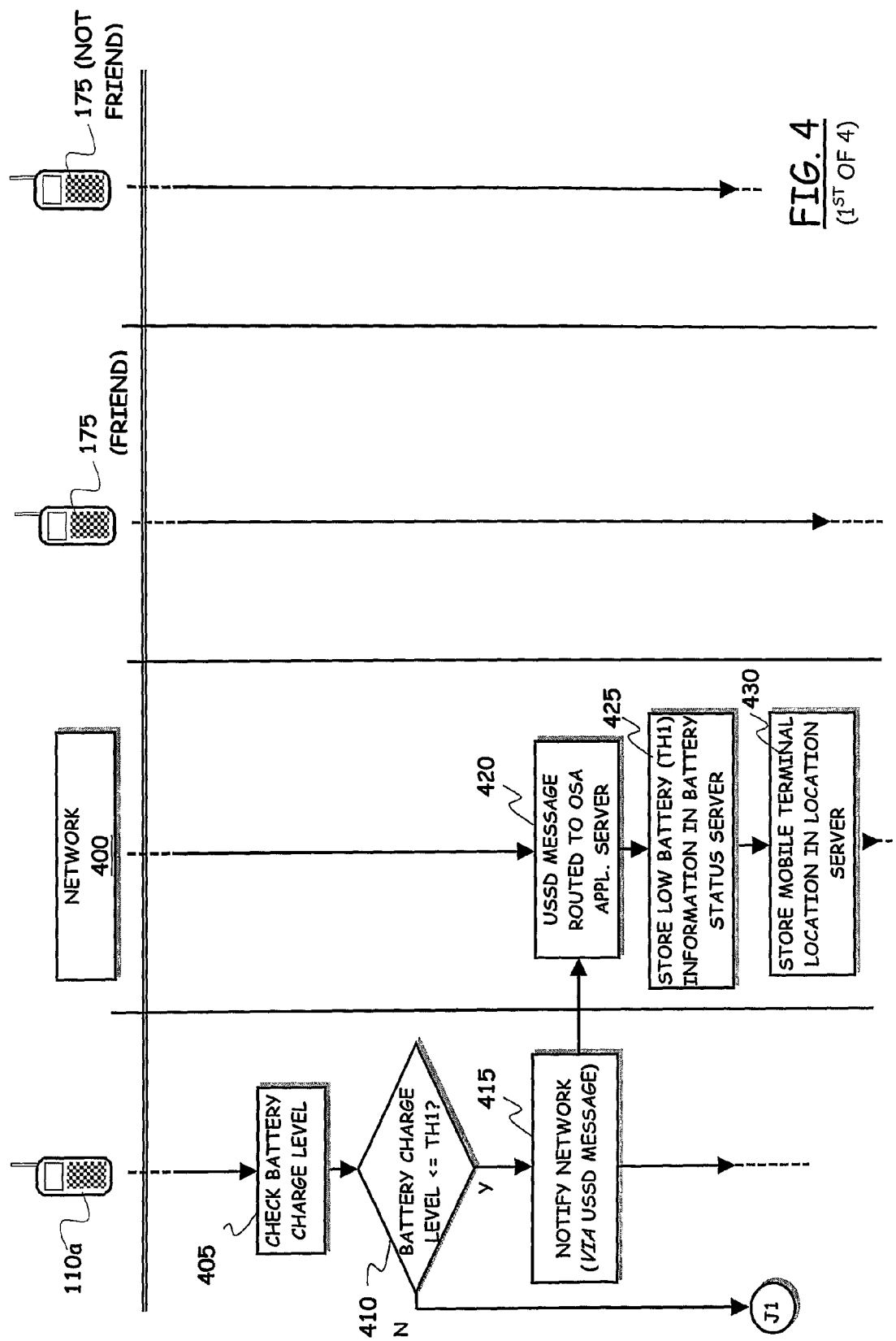

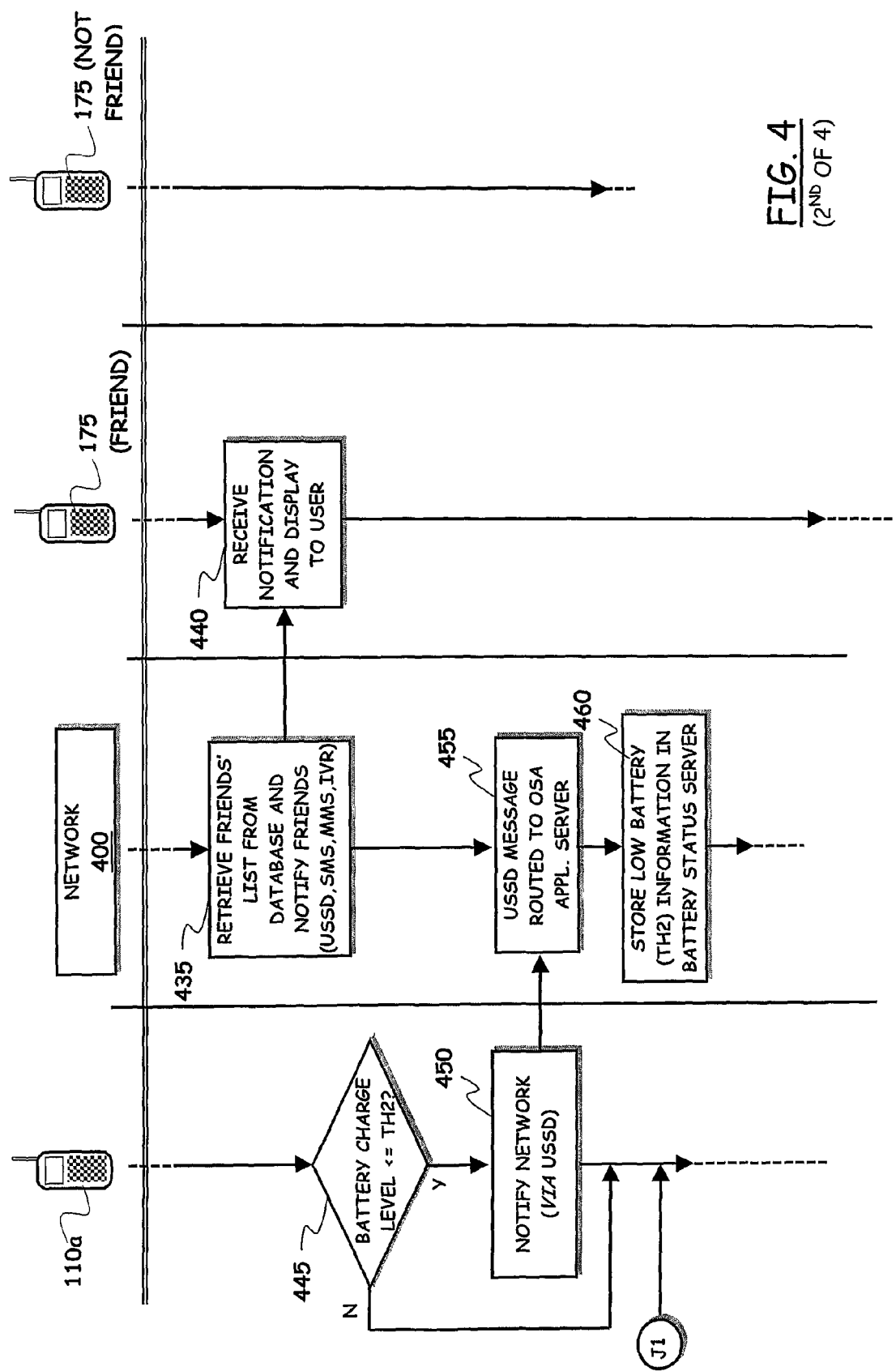

(3RD OF 4)

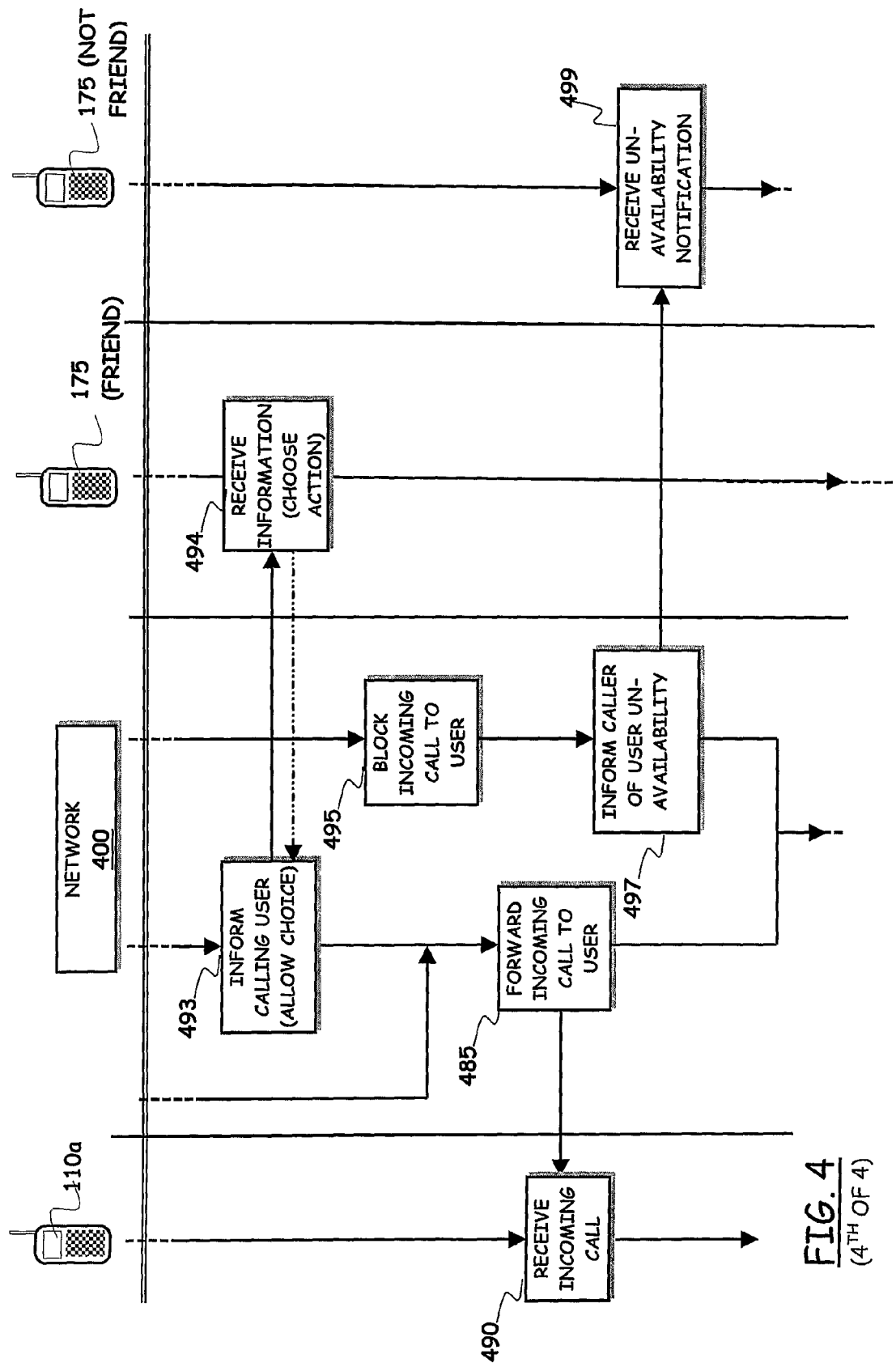

Figure 1:
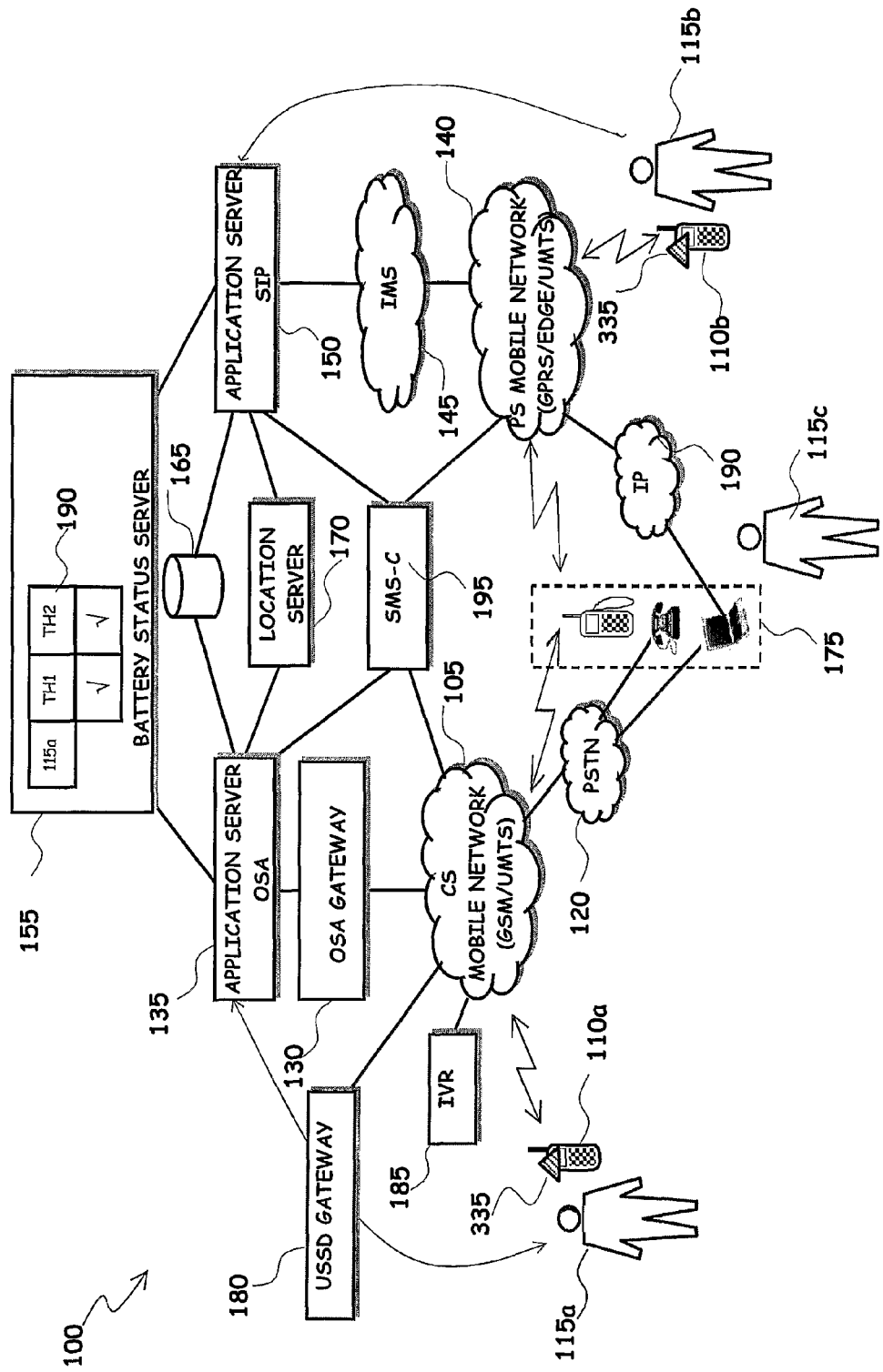

NETWORK CALL MANAGEMENT IN CASE OF LOW BATTERY CONDITION OF MOBILE COMMUNICATIONS TERMINALS

CROSS REFERENCE TO RELATED APPLICATION

This application is a national phase application based on PCT/EP2004/053706, filed Dec. 24, 2004.

FIELD OF THE INVENTION

The present invention generally relates to the field of telecommunications, particularly to mobile communications networks, such as for example GSM, GPRS/EDGE, UMTS mobile communications networks, allowing mobile users to communicate.

BACKGROUND OF THE INVENTION

In the past one or two decades, mobile communications terminals (e.g. mobile phones, user equipments, mobile stations, personal digital assistants, pocket computers and the like) used for exploiting the communications capabilities offered by mobile communications networks have experienced great improvements in performance.

An aspect that, in particular, has been improved concerns the operating autonomy of the mobile communications terminal.

Mobile communications terminals are in fact powered by batteries: the improvements in battery technology, in conjunction with the reduction of power consumption by the electronic circuitry of the mobile communications terminals, have significantly extended their operating range.

Nonetheless, the time operability of mobile communications terminals is still relatively limited, and this continue to represent a problem to be faced.

Typically, the responsibility of checking the battery charge level, and, depending on it, taking a proper conduct so to avoid ending with an unusable mobile terminal due to full battery discharge, is totally up to the user.

Completely relying on the fact that the user pay the due attention to this aspect is not particularly effective, nor particularly safe. In fact, nothing ensures that the user realizes in due time the low level of the battery charge and, in view of, e.g., his/her needs in the immediate future, adopt the correct conduct, by for example recharging the battery, or limiting the mobile communications terminal usage.

Additionally, it may happen that when the user realizes of the low battery charge condition, the battery level is already so low that the charge left is at best sufficient for placing/sending only one single voice call/message; this is in particular true when the battery has already been submitted to several charge/discharge cycles, considering that batteries degrade with time, so that an old battery may exhibit a faster charge fall than a new one.

In U.S. Pat. No. 6,236,326 a wireless telephone is described that when the battery nears depletion, and if a telephone call is not in progress, contacts the wireless telephone network and enables a call forwarding to a different number; if instead a telephone call is in progress, the wireless telephone plays an audible message to the party with whom the wireless subscriber is speaking, thereby informing the party that the wireless connection will soon be lost.

U.S. Pat. No. 6,704,583 describes a mobile telephone including a memory storing telephone numbers, and a controller detecting a telephone number of an incoming call, comparing the detected telephone number to the numbers stored in the memory, and determining whether the incoming call is to be received, even when a voltage supplied by the voltage source is equal to or lower than a predetermined threshold.

Solutions in which a mobile communications terminal provides to the mobile communications network indications about the battery charge have been proposed in the art.

For example, in WO 98/26622 the problems of call drops is faced. A mobile communications apparatus monitors the power level of its internal battery power supply, and the measured power levels are reported to and stored by the base station or switching node of a serving network. If an ongoing call should then be dropped, the stored power levels reported by the mobile communications apparatus engaged in the dropped call are retrieved and processed to determine whether the battery failure is a likely cause of the call drop: in the affirmative case, an appropriate cause notation is made in association with a recording of the instance of the call drop.

U.S. Pat. No. 6,408,172 is concerned about emergency calls placed within a cellular network. A battery status indicator associated with a calling mobile station during an emergency call is transmitted to the emergency center; the emergency center can provide special handling for such calls, such as displaying the low battery indicator to the emergency operator; in addition, the cellular network serving the mobile station can handover the call to a cell with lower power demands in order to prolong the battery life of the mobile station.

WO 98/10610 proposes a method for systematically scaling back the operations of a mobile station as its battery is continuously discharged by usage. Different mobile station operations are progressively disabled as the capacity of the battery falls below certain predetermined threshold levels: below the highest threshold level the mobile station sends a registration cancellation message to the serving system so as to prevent the receipt of any page message, then disables the transmit operation and enables only the receive operation. Below the lowest threshold level the mobile station does not completely shut off all operations, but instead allows the continuation of a minimum subset of operations, including the charging operation.

In EP 915 632 a base station of a wireless communications system receives battery power level information and other setup information from mobile stations operating within the service area of the base station during call setup procedures. Based on the battery power level information and other setup information, the base station assigns frequency channels to the mobile stations so that those mobile stations having battery power levels below a threshold value are assigned frequency channels that have lower interference levels than frequency channels assigned to other mobile stations. The frequency channel assignments are transmitted to the mobile stations.

In U.S. Pat. No. 6,072,784, scheduling priorities in a CDMA (Code Division Multiple Access) wireless communications system are adapted to conserve battery power in mobile terminals operating within the system. The transmit power of all mobile stations is controlled by the base station (which receives the battery power level information during call setup procedures) to optimally conserve the battery power of a particular mobile station reporting a low battery condition. The base station adapts scheduling priorities for the mobile terminals to expedite wireless transmission from those mobile terminals reporting low battery power levels.

SUMMARY OF THE INVENTION

The Applicant has observed that the solutions known in the art are not particularly satisfactory.

For example, in connection with the solution proposed in U.S. Pat. No. 6,704,583, the Applicant observes that, in case the incoming call is allowed to be received, the calling user is completely unaware of the low battery condition of the called user, and may thus not be prepared to the fact that the remaining battery charge is sufficient only for a very short conversation, thereby the call may irremediably fall before the important information is transferred. Moreover, the processing power requested to the mobile phone to detect and compare the telephone numbers of the incoming calls with those stored in memory causes a further decrease of the battery charge.

The solution set forth in WO 98/26622 has the purpose of allowing a network operator evaluate whether the call drops are caused by an improper working of the network infrastructure apparatus, or instead by the fact that the users involved in the dropped calls run out of battery, and so to limit the interventions on the network. The service is not at all directed to the users, which do not take any direct advantage of it.

In respect of WO 98/10610, the Applicant observes that the solution proposed simply anticipates the deregistration of the user to a time at which the terminal still has some battery power.

The Applicant has observed that it would be useful to make third parties aware of the fact that the user mobile communications terminal is experiencing a low battery charge condition. In such a way, third parties could limit or avoid calls directed to the mobile communications terminal, so as to limit the decrease of the battery charge of the latter. Furthermore, a third party, being aware of a low battery condition of a mobile communications terminal to which a call may be or is being placed, could take a suitable decision (e.g. postpone the call, or keep the call short in time) in order to limit or avoid a risk of loosing valuable information during a call due to an abrupt termination of the latter. A valuable service is thus given both to a user who is experiencing a low battery condition of its mobile communications terminal and to a third party considering a communication with such user.

The Applicant has accordingly devised a solution that allows implementing a service, at the network level (and particularly at the service application level, without substantially impacting the core and access network infrastructure), that is adapted to take notice of the fact that mobile communications terminals experience a battery power shortage, and to consequently inform third parties.

According to a first aspect of the present invention, there is provided in a mobile communications system comprising a mobile communications network (105, 130, 135, 155, 165, 170) and a battery-powered mobile communications terminal (110a), a method comprising:

receiving, at a mobile communications network apparatus subsystem, a notification of a low battery charge condition from the battery-powered mobile communications terminal, and having the mobile communications network apparatus subsystem inform at least one second user, different from a first user (115a) using the battery-powered mobile communications terminal, based on the received notification.

Briefly stated, in a mobile communications system comprising a mobile communications network and a battery-powered mobile communications terminal, a notification of a low battery charge condition from the battery-powered mobile communications terminal is received at a mobile communications network apparatus subsystem.

The mobile communications network apparatus subsystem inform at least one second user, different from a first user using the battery-powered mobile communications terminal, based on the received notification.

According to a second aspect of the present invention, there is provided a mobile communications system (100) comprising a mobile communications network (105, 130, 135, 155, 165, 170; 140, 145, 150, 155, 165, 170), characterized in that:

a mobile communications network apparatus subsystem is provided which is adapted to receive from a battery-powered mobile communications terminal (110a; 110b) a notification of a low battery charge condition, and to inform at least one second user, different from a first user (115a) using the battery-powered mobile communications terminal, based on the received notification.

The mobile communications system comprises a mobile communications network, and a mobile communications network apparatus subsystem is provided which is adapted 10 to receive from a battery-powered mobile communications terminal a notification of a low battery charge condition, and to inform at least one second user, different from a first user using the battery-powered mobile communications terminal, based on the received notification.

Figure 4:
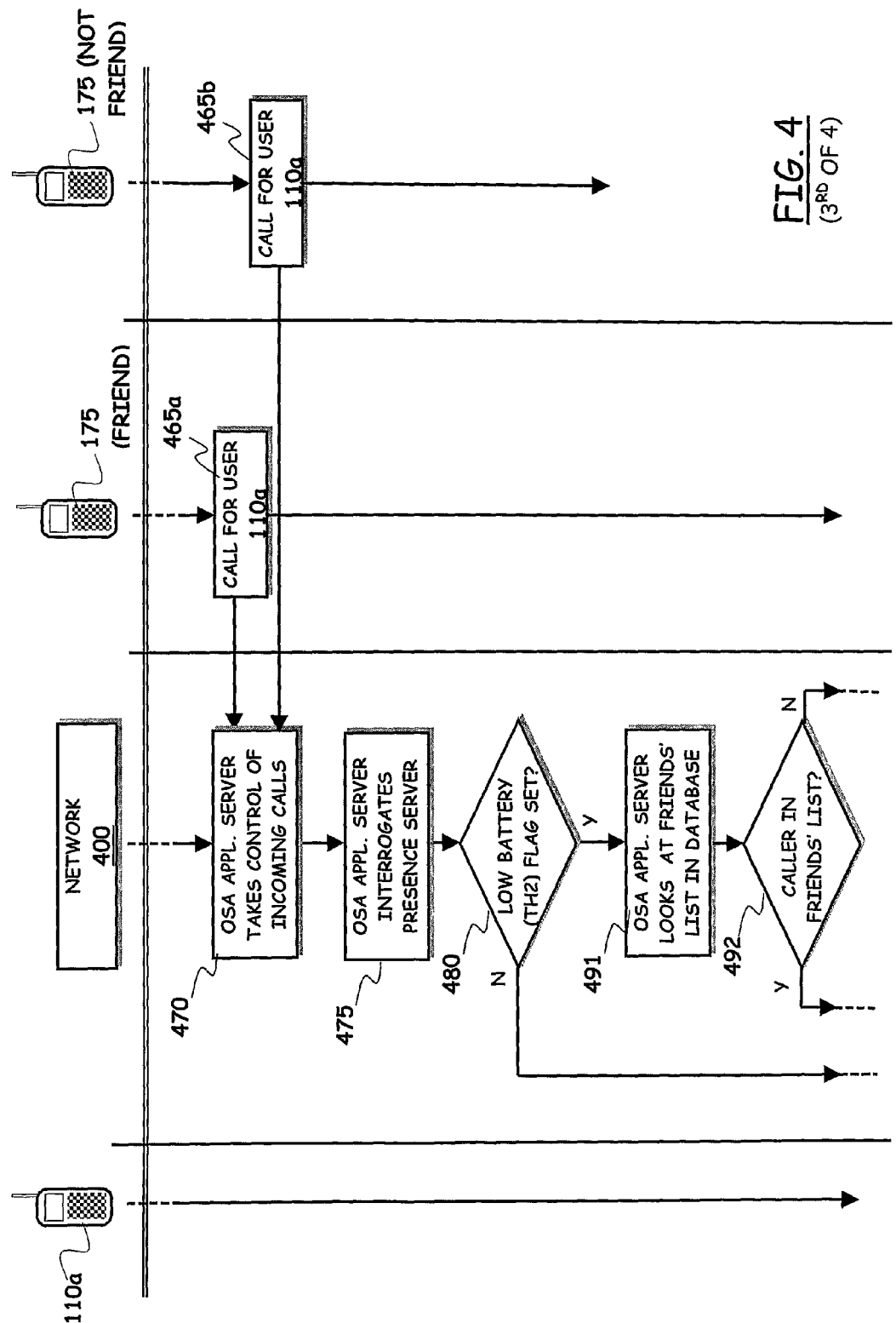

BRIEF DESCRIPTION OF THE DRAWINGS features and advantages of the present invention will be made apparent by the following detailed description of an embodiment thereof, provided merely by way of non- limitative example, description that will be conducted making reference to the annexed drawings, wherein:

FIG. 1 pictorially shows a communications networks infrastructure adapted to provide a service implementing a method according to an embodiment of the present invention;

FIG. 2 schematically depicts the structure of a database of users' telephone numbers in respect of a subscriber user of the service;

FIG. 3 depicts, in terms of functional blocks, the structure of a generic mobile communications terminal according to an embodiment of the present invention; and FIG. 4 is a schematic flowchart illustrating in a simplified way some of the steps of the method according to an embodiment of the present invention.

DETAILED DESCRIPTION OF THE PREFERRED EMBODIMENT(S) OF THE INVENTION

Referring to the drawings, FIG. 1 shows schematically an infrastructure of mobile communications networks, particularly focusing on the service and control layers, according to exemplary, non limitative, embodiments of the present invention. The infrastructure of mobile communications networks is globally identified by reference numeral 100.

The infrastructure 100 comprises a Circuit-Switched (CS) mobile communications network 105, for example a GSM network (i.e., a mobile communications network complying with the Global System for Mobile communications standard) or a Circuit Switched UMTS network (i.e., Universal Mobile Telecommunications System).

In a way per-se known in the art, the CS network 105 includes (in the exemplary case of a GSM network) a plurality of Base Station Subsystems (BSSs), each one providing coverage for mobile communications in a respective geographic region. The generic BSS comprises a plurality of Base Transceiver Stations (BTSs), each one covering a respective area, typically referred to as a "cell", within the region covered by the BSS; the generic BTS communicates with, i.e., handles the transmission/reception of signals to/from the mobile communications terminals, such as a mobile communications terminal 110a of a user 115a shown in the drawing, which are located in the BTS's cell. Typically, several BTSs are connected to and controlled by a same Base Station Controller (BSC), a network unit that, roughly speaking, instructs the different BTSs about the information to be transmitted to/received from the mobile communications terminals on specified physical, radio communication channels.

Groups of different BSSs are connected to respective Mobile Switching Centers (SCs); the generic MSC performs the function of gateway to other MSCs of the same mobile communications network 105, to the MSCs of other mobile communications networks (of different network operators), to one or more wired, Public Switched Telephone Networks (PSTNs), like a PSTN 120 shown in the drawing. The MSC is associated with a Home Location Register (HLR), containing subscription data of users subscriber to the mobile communications network, particularly mobile phone numbers, and with a Visitor Location Register (VLR), containing information on where the various users are located at a given time, i.e., under which cell of the mobile communications network 105 the users' mobile communications terminals are registered at that time. Based on this information, the MSC switches, i.e., properly routes calls from callers to called users.

In an embodiment of the present invention, the CS network 105 is or includes a UMTS network. Without going into details with the UMTS architecture (which is similar to the GSM architecture just outlined), the important aspect, in the considered context, related to the UMTS network architecture is that it furnishes a richer set of services to the user than the GSM architecture (e.g., a CS videocall service).

The network infrastructure 100 comprises a subsystem of network apparatuses cooperating for providing services according to the pres invention.

To this purpose, according to an embodiment of the present invention a structure of Network Intelligence (NI) is provided in association with the CS mobile network 105.

In particular, according to an embodiment of the present invention, the NI structure includes an Open Service Access (OSA) gateway 130, by means of which the CS mobile network 105 interfaces with an OSA Application Server (AS) 135, wherein the logic of one or more CS mobile network services is implemented.

The OSA gateway comprises two different entities: the OSA Service Capabilities Systems (SCSs) and the OSA framework. The OSA SCSs are the OSA gateway functionalities that enable the applications (running on the OSA AS) to access the underlying mobile network resources (e.g. resources for call control and user interaction). The OSA framework allows, among other functionalities, the SCSs authentication and registration and enables the application access the network resources.

In another embodiment of the present invention, instead of exploiting an OSA gateway and an OSA AS, the mobile network control layer and the mobile network application layer functionalities are implemented by means of an Intelligent Network (IN) structure, the basic element of which is the Service Control Point (SCP), connected to the underlying MSCs of the CS network 105 and running the service logic of the network service according to the invention embodiment herein described.

The mobile communications networks infrastructure 100 further comprises a Packet-Switched (PS) mobile communications network 140, such as for example a GPRS (General Packet Radio Service) or an EDGE (Enhanced Data-rate for GSM Evolution) network or PS UMTS network, allowing mobile users, provided with suitable mobile communications terminals, such as a user 115b owning a mobile communications terminal 110b, to benefit of a PS-based data exchange capability, for example in order to access a packet-based network, typically the Internet, and exploit services offered by specific Internet servers.

Without entering into excessive details, known in the art and not relevant to the understanding of the invention embodiment herein described, a PS mobile communications network 140 in accordance with the GPRS and the UMTS standards essentially is a CS mobile network add-up, being a technology compatible with the CS mobile networks, that supports packet-based data communication, thereby enabling data transfer at a speed higher than that allowed by pure CS mobile networks.

In short, the PS mobile network includes Gateway GPRS Support Nodes (GGSN) that act as an interface between the mobile communications network and other, external packet data networks, such as the Internet, or other PS mobile communications networks (e.g., of other network operators). The GGSNs exchange data packets with Serving GPRS Support Nodes (SGSNs), each one associated with one or more respective BSSs of the associated GSM network, e.g., the GSM network 105, through Packet Control Units (PCUs), and routes the data packets received from the GGSNs to the proper destination mobile communications terminals, located in the geographic area covered by the respective BSS (or by one of the respective BSSs). In particular, the generic SGSN keeps track of the geographical location of the UEs, so as to know where the data packets are to be routed in order to be delivered to the intended destination mobile communications terminals. The PCU converts the data packets, received from the respective SGSN, into data streams adapted to being transmitted "over the air", by one of the BTSs, exploiting the radio resources of the CS mobile communications network; similarly, data streams transmitted by the mobile communications terminals "over the air" and received by the BTSs are converted into data packets, for transmission to the respective SGSN.

Also schematically shown in FIG. 1 is a 3GPP-compliant IP (Internet Protocol) Multimedia Subsystem (IMS) infrastructure 145 associated with the PS mobile communications network 140 (3GPP stands for $3^{rd}$ Generation Partnership Project), for enhancing the packet-based communications capabilities of the network by defining an open IP-based (more generally, packet-based) service infrastructure that enables an easy deployment of new rich multimedia communications services mixing telecom and data services, and particularly person-to-person IP multimedia services.

Briefly, the basic elements of the IMS infrastructure 145 include Call Session Control Functions (CSCFs), including Proxy Call Session Control Functions (P-CSCFs) connected to respective Serving Call Session Control Functions (S-CSCFs); roughly speaking, the P-CSCFs are the interface between the mobile communications terminals and the IMS infrastructure 145, and behave as proxy, accepting requests from the mobile communications terminals and internally managing or forwarding them to, e.g., the S-CSCFs; the S-CSCFs can in turn behave as a proxy, accepting the incoming requests and managing them internally, or forwarding them to other elements of the IMS infrastructure, such as the Interrogating Call State Control Functions, which is the interface to operator's network. Within the IMS infrastructure, the signaling is compliant to the SIP (Session Initiation Protocol), an IETF (Internet Engineering Task Force) proposed standard for setting up sessions between one or more clients in IP-based networks.

The (S-CSCFs) of the IMS infrastructure 145 colloquiate with a SIP application server 150, managing the SIP service logic for the IMS infrastructure 145.

For the sake of simplicity, for the purposes of the present description, by "call" 10 there is intended indifferently a telephone call (including a videocall) in the CS network, or an IP session in the PS network; similarly, by "message" there is intended indifferently a 'telephony-related message' (e.g., a USSD, an SMS, an MMS message) or an 'Internet-related message' (e.g., a Presence message and Instant message).

According to an embodiment of the present invention, a network service is implemented managing a low battery charge condition of the mobile communications terminals. In particular, in an embodiment of the present invention, the OSA application server 135 and the SIP application server 150 interact with a battery status server 155, responsible of memorizing information (schematically depicted as a table 190) about a battery charge level of the mobile communications terminals of mobile users, such as the users 115a and 115b, particularly information about a condition of low battery charge level. Typically, mobile users wishing to benefit of such a network service may be requested to subscribe for it at the network operator.

A mobile users' profile database 165 related to the service is further provided, wherein individual profiles of mobile users subscribers to the network service are stored.

The users' profile database may be provisioned either from the service provider or the subscribers: in the latter case, the generic subscriber can provision the database via e.g. a web interface (i.e. via IP access, in case the subscriber is IP-enabled), or via SMS messages, or via USSD (Unstructured Supplementary Service Data) messages, or the like (as known, USSD is a technology peculiar of the GSM making possible transmission of information via alphanumeric messages—i.e. composed by the characters *, #, numerical and literal—over the GSM signaling channels).

In particular, as schematically depicted in FIG. 2, according to an embodiment of the present invention the profile 200 of the generic mobile user, like the user 115a or the user 115b, stored in the database 165 may include a first list ("friends list") 205a of one or more telephone numbers to which that user wishes that a notification of the state of low battery charge of his/her mobile communications terminals is sent, such as for example a fixed (PSTN) telephone number and/or a mobile telephone number of another user 115c, or his/her e-mail address. More generally, the database 165 includes any information suitable to address to the user 115c (through one or more of his communications terminals, globally indicated in FIG. 1 by 175 and including for example a mobile phone, and/or wired telephone, and/or a computer connected to/connectable to an IP network 190, possibly via a dial-up connection) a notification (of whichever type) of the low battery charge condition of the terminal 110a, 110b of the user 115a, 115b. For example, an SMS (Short Messaging Service) or MMS (Multimedia Messaging Service) message, a voice message, an e-mail message, an Instant Message (IM), provided that the user 115c has an IMS-compliant mobile communications terminal 175, may be sent to the "friend" user 115c.

The mobile users' profile database 165 may additionally include, for each subscriber user, a second list ("white list") 205b of one or more telephone numbers (provisioned on the users' profile database as the "friends list" with the same provisioning options previously described) from which the user wishes to receive possible calls (possibly SMS messages, MMS messages, IMs) even if the state of battery charge of his/her mobile communications terminal is low (this second list may include one or more of the telephone numbers of the friends list).

Coming back to FIG. 1, according to an embodiment of the present invention, a location server 170 is additionally provided, responsible of storing location information adapted to identify a geographical location of the generic subscriber mobile user when the user's mobile communications terminals reaches and notifies to the network the low battery charge condition. The location information may for example be derived from the VLRs of the mobile communications network or from any suitable localization system.

A block labeled 195 identifies a Short Messaging Service Center (SMS-C) assumed to be compliant to both the CS and the PS networks standards; the SMS-C 195 manages the distribution of SMS message, and communicates with the CS mobile network 105, the PS mobile network 140, the OSA application server 135 and the SIP application server 150.

It is observed that albeit depicted as separate blocks in the drawing, one or both of the battery status server 155 and the location server 170 may be functions implemented by either the physical apparatus running the OSA application server 135, or the SIP application server 150, or both. Moreover, also the OSA application server 135 and the SIP application server 150 may be implemented on the same physical apparatus.

It is also remarked that although in the description provided in the foregoing the existence of both a CS- and a PS-mobile communications networks has been considered, for the sake of completeness, this is not to be construed as a limitation of the present invention, which might in fact be applied also in scenarios where only one mobile communications network exist, either the CS-based or the PS-based.

The notification of the reached condition of low battery charge to the mobile communications network is responsibility of the mobile communications terminals, which preferably automatically issue such notification. FIG. 3 depicts very schematically, in terms of functional blocks relevant to the understanding of the invention embodiment herein described, a structure of a generic mobile communications terminal, like for example the mobile communications terminal 110a. It is observed that despite the mobile communications terminals adapted to operate with a PS-based mobile communications network like the PS mobile network 140, particularly mobile communications terminals complying with the IMS standard, may differ from mobile communications terminals capable of operating in a CS-based mobile communications networks, like the GSM network 105, the discussion herein below is sufficiently general to be applicable to any kind of mobile communications terminal.

A data processor, e.g., a microprocessor 305 governs the operation of the mobile communications terminal. The mobile communications terminal communicates, over a bus 307, with peripheral units comprising in particular a Read Only Memory (ROM) 310, storing the microcode representing the program to be executed by the microprocessor 305, and a working memory, typically, but not only, a Random Access Memory (RAM) 315, exploited by the microprocessor 305 for the program execution and for the temporary storage of data. A transmitter/receiver circuitry 320 allows radio communication with the network's radio access front-end. The mobile communications terminal includes a (removable and interchangeable) Subscriber Identity Module (SIM) 325, which is an Integrated-Circuit (IC) smart-card module used primary for authentication and registration purposes of the mobile communications terminal in the mobile communications network, and having its own data processing and storage capabilities.

The hardware of the mobile communications terminal, particularly the microprocessor 305, the ROM 310, the RAM 315, the TXRX section 320, the SIM 325 (as well as a display, a keyboard, a microphone, a loudspeaker, not shown in FIG. 3 for simplicity), is powered by a battery 350.

Also schematically depicted in FIG. 3 is a (partial) content of the working memory 315 of the mobile communications terminal in operation. An operating system 330 handles the interface to peripheral hardware, schedules tasks, allocates storage, or the like; the operating system 330 may for example be the known Symbian OS by Symbian Ltd.

When the mobile communications terminal is put in operation, a battery charge level monitoring client module 335 is running, which is responsible of monitoring the battery charge level. For example, the microprocessor 305 may be provided with an analog input 350a to which there is associated an embedded Analog-to-Digital (A/D) converter, adapted to measure the battery voltage for determining the battery charge level.

The measured battery charge level is then provided to the battery charge level monitoring client module 335, for processing. It is observed that almost all of the current mobile communications terminals implement a battery charge level monitoring function, usually adapted to display to the user an indication of the remaining battery charge, and to beep when a too low battery charge level is reached: the battery charge level monitoring client module 335 according to an embodiment of the present invention may be implemented as an expansion of these functions already implemented. In particular, the battery charge level monitoring client module 335 is adapted to compare the measured battery charge level with one or more predetermined thresholds, for example, in an embodiment of the present invention, an upper threshold TH1 and a lower threshold TH2 (stored for example in the ROM 310, and whose value may depend on the particular type of mobile communications terminal, for example on the type of battery 350).

Preferably, hysteresis is implemented: the thresholds TH1 and TH2 are both associated with two different values, respectively said TH1d (TH1 discharge) and TH1c (TH1 charge), and TH2d (TH2 discharge) and TH2c (TH2 charge); the notations "discharge" and "charge" indicate the crossing of the two thresholds TH1 and TH2 during a battery discharge phase, and a successive battery recharge phase, respectively.

For both the thresholds TH1 and TH2 the discharge level TH1d, TR2d is lower than the charge level TH1c, TH2c. In other words, while the battery is discharging (during normal use of the terminal), the reference thresholds exploited by the module 335 as comparison values are the discharge thresholds TH1d, TH2d; on the contrary, during a re-charge of the battery, or when the battery is replaced, the thresholds used by the module 335 as comparison values are the charge thresholds TH2c, TH1c.

In a preferred embodiment of the invention, the battery charge level monitoring client module 335 is further adapted to cause the mobile communications terminal notify to the mobile communications network information concerning its battery charge level, particularly of the crossing of the thresholds TH1d, TH2d, TH2c and TH1c; for example, the functions of a USSD client module 340 are exploited in order to send USSD messages to the network HLR; a USSD gateway, identified by 180 in FIG. 1, is exploited for properly routing the USSD message between the HLR and the application server, as described later on. Alternatively, the information concerning the mobile communications terminal's battery charge level may be communicated to the mobile communications network via SMS messages, or Instant messages, or Presence messages (in the case of an IMS mobile terminal). In case the mobile communications terminal is IMS-compliant, like the terminal 110b, the battery charge level monitoring client 335 may exploit a SIP signaling module (identified in FIG. 3 by the same reference numeral 340, for the sake of simplicity) for providing to the IMS network the information concerning the mobile communications terminal's battery charge level.

In another embodiment of the invention, the client 335 on the mobile communications terminal just signals to the subscriber user the crossing of the thresholds TH1d, TH2d, TH2c and TH1c, and let the subscriber the option to notify to the mobile communications network the different states of the battery (via USSD messages, SMS messages, Presence Messages or Instant Messages).

It is intended that at least some of the functions described in the foregoing, particularly the battery charge level monitoring client module 335 and/or the USSD client module 340 might be executed by the data processing units of the SIM 325, instead of by the microprocessor 305.

In operation, a user subscribes to the network service; his/her mobile communications terminal monitors the battery charge level and notifies to the network events relating to its battery charge level, particularly the fall of the charge level below one or more threshold levels TH1d, TH2d). The network consequently informs third parties based on the received notification. For example, another user trying to place a call to the user experiencing a low battery charge may be informed of this critical condition by a courtesy message, and he/she may be given the option of whether to continue with or release the call. In order to inform third parties, the network may additionally or alternatively send SMS messages, MMS messages, Instant messages or any other notification to a restricted, user-defined list of other users. In this way, a service is given to both a user that is experiencing a low battery condition of his/her mobile communications terminal, and a third party that wants to place a call (or send a message) to such user. The third party has the option of not placing or continuing with the call, or to keep the call short in time, so as to limit a risk of loosing valuable information due to an abrupt termination of the call. On the other hand, the user can take advantage of a reduced number of received calls (or messages), thus saving battery, so as to maintain, e.g. the possibility to place emergency calls or the like.

In the following, an exemplary embodiment of the present invention will be described in detail, making reference to the simplified flowchart of FIG. 4 and to the infrastructure of FIG. 1, by which the mobile communications network, in addition to informing third parties based on a notification of low battery condition received from a subscriber user's mobile communications terminal, also manages calls/messages directed to that user taking into account the low battery charge condition.

In the flowchart, for the sake of simplicity, a block labeled by reference numeral 400 ("network") is intended to include the CS mobile network 105, the OSA gateway and application servers 130 and 135, the battery status server 155, the database 165, the location server 170, the USSD gateway 180.

It is observed that the users wishing to benefit of the network service according to the embodiment of the invention herein described should preliminary subscribe for it; upon subscribing, suitable resources in the battery status server 160, in the profiles database 165 and in the location server 170 are defined and reserved to the new subscriber user, moreover, upon subscription, a trigger is set at the level of the HLR/VLR, and it is checked during the call switching and routing from the network, for example at the MSCs of the GSM network 105 in respect of the subscriber user, thereby the control of any call (and, possibly, of any message, such as SMS messages, MMS messages or Instant Messages), directed thereto is passed over to the OSA application server 135 or the SIP application server 150, which, based on the service logic, will manage the calls (and the messages), for example in the way that will now be described.

At the mobile communications terminal 110a, the battery charge level monitoring client module 335 periodically checks the level of charge of the battery 350 (block 405); this can be done for example from time to time, as a routinely task during the mobile communications terminal operation. The detected battery charge level is compared to the first, higher predetermined threshold TH1 (decision block 410), particularly to the discharge threshold TH1$d$ associated with the upper threshold TH1; in case the battery charge level is found to be higher than the threshold TH1$d$ (exit branch N of decision block 410), no particular action is taken, and the operation of the mobile communications terminal 110 proceeds as usual (connector J1). If instead the battery charge level is found to be equal to or lower than the threshold TH1$d$ (exit branch Y of decision block 410), the battery charge level monitoring client module 335 invokes the USSD client module 340 to cause the mobile communications terminal 110a notify the network 400, via an USSD message, the reached low battery charge condition (upper threshold). (block 415). Alternatively, the mobile communications terminal 110a may notify the network 400 by means of an SMS message or in any other suitable way, the invention being not restricted to a particular way of notifying the network of the reached low battery charge condition.

The USSD message sent by the mobile communications terminal 110a is received at the HLR of the network 105, which forwards it to the USSD gateway 180; the USSD gateway 180 routes the USSD message to the OSA application server 135 (block 420). The OSA application server 135 communicates with the battery status server 155 to cause the storage of the signaled low battery charge condition (as schematically depicted in FIG. 1, in the table 190 relating to the user 115a a flag corresponding to the higher threshold TH1 is set) (block 425).

Optionally, the OSA application server 135 further causes the location server 170 to store a location indication adapted to identify the current geographic location of the terminal 110a (block 430). The location indication may for example be derived from the VLRs of the GSM network 105, or from any other localization service.

In consequence to the notification, third parties can be informed by the network of the low battery charge condition experienced by the mobile communications terminal 110a. In particular, users whose telephone numbers are in the first (friends) list 205a in the database 165 can be notified of the low battery condition of the terminal 110a of the user 115a.

To this purpose, the OSA application server 135 retrieves from the database 165 the telephone numbers listed in the first list 205a, and issues a notification to the friends users, so as to inform them of the low battery charge of the terminal 110a of the user 115a (block 435). The notification can be made in any suitable form, such as for example by way of an SMS message, or an USSD message, or an MMS message, or by exploiting an Interactive Voice Response (IVR) service 185, through either the USSD gateway 180 or the OSA gateway 130, or by way of an Instant Messaging notification over the IMS network, or even by means of an e-mail message, depending on the type of communications terminal of the destination user (the latter piece of information may be, for example, stored in the database 165, in the list 205a, associated with the telephone number of the user).

The generic friend user whose telephone number is in the list 205a receives the notification from the network, for example in the form of an SMS message at his/her mobile communications terminal 175, and the notification is displayed to him/her (block 440).

Optionally, the notification issued to the friend users whose telephone numbers are in the list 205a may include information, retrieved from the location server 170, adapted to identify where the user 115a was when his/her mobile communications terminal reached the low battery charge level condition, or other information personalized from the subscriber (e.g. drawings or photos).

Totally similar actions are performed in case the mobile communications terminal is an IMS-compliant mobile communications terminal, like the mobile communications terminal 110b. In particular, instead of the USSD message, a SIP signaling can in that case be exploited, for notifying the SIP application server 150 of the reached low battery charge condition; similarly to the OSA application server 135, the SIP application server 150 communicates with the battery status server 155 to cause the storage of the signaled low battery charge condition information and, optionally, with the location server 170, to cause storage of the geographic location information. The SIP application server 150 then retrieves from the database 165 the telephone numbers in the first list 205a, determines the type of communications terminals that numbers correspond to, and issues a notification (in a form adapted to the type of communications terminals) to these users so that they are informed of the low battery charge of the user's mobile communications terminal 110b. The generic user whose telephone number is in the list 205a receives the notification.

It is observed that the first threshold TH1, and particularly the associated discharge threshold TH1$d$ should be set sufficiently high, so that after the mobile communications terminal has reached the corresponding battery charge level, there is sufficient charge left to allow the mobile communications terminal work for a reasonable period of time.

The friend users that received the notification of the low battery charge condition, being informed of such situation, may thus adopt the best behavior in order to preserve the remaining battery charge in the mobile communications terminal 110a (or 110b) of their friend 115a (respectively 115b). For example, they can decide to avoid placing unnecessary calls/sending unnecessary messages.

The detected battery charge level is then compared to the second, lower predetermined threshold TH2 (decision block 445), particularly to the discharge threshold TH2$d$. It is pointed out that albeit in the schematic flowchart of FIG. 4 this action is depicted as following the actions of blocks 410 and 415, this chronological order is not strictly necessary; moreover, the comparison of the detected battery charge level with the second threshold TH2$d$ may be done at a later time, for example, at a subsequent invocation of the battery charge level monitoring task.

If the detected battery charge level is found to be higher than the threshold TH2$d$ (exit branch N of decision block 445), no further action is taken. If instead the detected battery charge level is found to be equal to or lower than the second, lower threshold TH2$d$ (exit branch Y of decision block 445), the battery charge level monitoring client module 335 invokes again the USSD client module 340 to cause the mobile communications terminal 110a notify the network 400, via an USSD message, the new low battery charge condition (block 450). As in the previous case, the USSD message sent by the mobile communications terminal 110a is received at the HLR of the network 105, which forwards it to the USSD gateway 180, and the USSD message is then routed to the OSA application server 135 (block 455). The OSA application server 135 communicates with the battery status server 155 to cause the storage of the newly reached low battery charge (lower threshold TH2d) condition signaled by the mobile communications terminal 110a (block 460). Optionally, the OSA application server 135 further causes the location server 170 to store an indication adapted to identify the current geographic location of the mobile communications terminal 110a.

In consequence to this further notification by the mobile communications terminal 110a, the network can block incoming calls/messages directed to the mobile communications terminal 110a, so as to save the remaining battery life. In particular, the network may perform a selective filtering of the incoming calls/messages, depending on the user originating the incoming call/message; for example, calls placed or messages sent by users whose telephone numbers are not in the second list 205b in the database 165 are blocked. A courtesy message can be exploited for informing the calling users in these cases.

In an exemplary embodiment of the present invention, the management of the incoming calls/messages by the network is the following. The case of an incoming call is considered first.

As mentioned in the foregoing, when the user 115a subscribes to the network service, a trigger is set at the HLR/VLR level of the CS network 105. Thanks to the trigger being set, any incoming call directed to the mobile communications terminal 110a is passed over to the OSA application server 135. Referring to FIG. 4, let it be assumed that a call is placed to the mobile communications terminal 110a of the user 115a, by either a "friend" user, i.e., a user whose telephone number, e.g. mobile, telephone number, is included in the second list 205b (block 465a) or a "non-friend" user, that is a user whose, e.g. mobile, telephone number is instead not included in the list (block 465b). The OSA application server 135 receives and takes control of the calls (block 470), and contacts the battery status server 160 to check whether the mobile communications terminal 110a of the user 115a has notified any low battery charge condition (block 475). In case no such notification has been made, or the mobile communications terminal 110a has notified only the reaching of the upper threshold TH1 (in particular, the threshold TH1d), the OSA application server 135 forwards the incoming call to the user's mobile communications terminal 110a without performing any further control. For example, the OSA application server 135 may further check if the flag "TH2", corresponding to the reaching of the lower discharge threshold TH2d is set in the table 190 held by the battery status server 160) (decision block 480). In the negative case (exit branch N of decision block 480), i.e. if the flag "TH2" is not set, the incoming call is forwarded to and received at the mobile communications terminal 110a (block 490), irrespective of who is the calling user. The user 115a may as usual decide whether or not to accept the incoming call and answer.

In case instead the OSA application server 135 finds that the flag "TH2" is set (exit branch Y of decision block 480), the OSA application server 135 looks at the database 165 (block 491) and checks whether the (telephone number of the) calling user is in the second list 205b (decision block 492). In the affirmative case (exit branch Y of decision block 492), before forwarding the telephone call to the destination user's mobile communications terminal 110a the OSA application server 135 may inform the calling user of the low battery charge condition currently experienced by the called user's mobile communications terminal 110a, so as to make the calling user aware of this situation and allow adopting the best conduct (block 493); this can be done for example by routing first of all the calls to the IVR 185 (or to the MSC service) in order to play an announcement to the caller, and only after the end of the announcement, route the call to the subscriber. The calling user, in addition to being informed of the low battery condition of the caller user, may also be given the possibility to choose whether to release the call, or to continue the call (block 494), in which case the incoming call is forwarded to (block 485) and received at the mobile communications terminal 110a (block 490). The user 115a may decide whether or not to accept the incoming call and answer.

If instead the (telephone number of the) calling user is not in the list 205b (exit branch N of decision block 492), the incoming call is blocked by the OSA application server and not forwarded to the user's mobile communications terminal 110a (block 495), so as to preserve the remaining battery charge. The network 400, for example exploiting the IVR service 185 (or the MSC service), informs the calling user that the called user 115a is momentarily unavailable (block 497), as if the user 115a was deregistered (for example, as if he/she had the mobile communications terminal turned off). The unavailability notification is received by the caller (499). As in usual cases of temporary unavailability, the network 400 may detour the incoming call to a voice mailbox, where the calling user may leave a message, and keep memory of the telephone number of the caller, so as to notify (for instance via an SMS message, an MMS message or an Instant Message), at a later time, the called user 115a that an incoming call was lost during the period of low battery charge level, or a list of lost incoming calls may be sent in a similar way.

A similar behavior may be adopted in the case of an incoming SMS or MMS message, or the like: also in this case, the message is forwarded to the intended destination user's terminal 110a or is blocked depending on whether the user's terminal 110a has notified a condition of low battery charge.

For the sake of simplicity, it is considered only the SMS message delivery case (the case of other messages being similar: for example, an MMS message usually starts with the sending of an SMS message). Referring to FIG. 1, the SMS-C 195 manages the distribution of SMS message: when an SMS message directed to the subscriber 115a reaches the SMS-C 195, the SMS-C forwards the message to the OSA application server 135; the application server implements the same logic previously described for the incoming call, contacting the battery status server 155 and checking whether the mobile communications terminal 110a of the user 115a has notified a low battery charge condition; in case no such signaling has been made, or the mobile communications terminal 110a has notified the reaching of the first, upper threshold TH1, the application server 135 forwards the SMS message to the user's mobile communications terminal 110a without performing any further control. In case the mobile communications terminal 110a has notified the reaching of the lower battery charge level threshold TH2, the OSA application server 135 firstly checks if the sender user is in the second list 205b: in the affirmative case, the SMS message is forwarded to the user 115a, otherwise the SMS is stored to be delivered when the battery charge of the terminal 110a is restored.

Totally similar actions are performed by the SIP application server in case the user subscriber to the network service has an IMS-compliant mobile communications terminal, like the mobile communications terminal 110b. In this case, the subscriber user is assigned filtering criteria, that are for example stored in the users' profiles database (the IMS functionality of HSS—Home Subscriber Server), and that are exploited by the SIP application server 150 for controlling the incoming calls/messages directed to the subscriber user; the service logic implemented by the SIP application server is essentially the same as that previously described in respect of the OSA application server.

It is observed that albeit not explicitly shown in the flowchart (for the sake of simplicity), the battery charge level monitoring client module 335 manages suitable flags adapted to keep memory of the fact that the fall of the battery charge level below one or both of the thresholds TH1 and TH2 in the discharge phase (and thus, the fall of the battery charge level below the thresholds TH1$d$ and TH2$d$) has already been signaled to the network 400, so that the notification is sent only once, the first time the battery charge level reaches or falls below the respective threshold.

Moreover, the battery charge level monitoring client module 335 is adapted to monitor the rise of the battery charge level above one or both of the thresholds TH1 and TH2 (which, due to the hysteresis, in the charge phase correspond to the thresholds TH2$c$ and TH1$c$, typically as the consequence of the battery recharge, or of a battery replacement, and to correspondingly signal such occurrences to the network 400 (via USSD messages, SMS messages or Instant Messages), in a way similar to that described in the foregoing in connection with the signaling of the battery discharge, so as to update the user's record 190 in the battery status server 155. Thus, after the battery is recharged or changed, and the battery charge level returns above the threshold TH2$c$ or even above the threshold TH1$c$, the mobile communications terminal 110$a$ notifies the network 400, and the "TH2" (and/or the "TH1") flag is reset in the record 190 at the battery status server 155; in consequence of this, the network may notify the friend users (those listed in the first list 205$a$) that the situation of low battery charge condition has been overcome from the subscriber' mobile terminal and from that point on they are again free to placing calls/sending messages, being the incoming calls/messages directed to the user's mobile communications terminal 110$a$ no longer blocked, at least until the battery charge level monitoring client module 335 detects that the battery charge level is again fallen below the thresholds TH1$d$, TH2$d$.

The OSA application server can then notify the user 115$a$ of the telephone numbers of calling users whose calls have been blocked.

Although the present invention has been disclosed and described by way of some embodiments, it is apparent to those skilled in the art that several modifications to the described embodiments, as well as other embodiments of the present invention are possible without departing from the spirit or essential features thereof/the scope thereof as defined in the appended claims.

For example, the number of battery charge level thresholds is not at all limitative to the present invention. More thresholds might in fact be set, with differentiated actions taken upon reaching of each threshold. Also, just one single threshold may be adopted, e.g., the lower threshold TH2, and in such a case the actions of notifying the users whose telephone numbers are in the first list 205$a$ blocking incoming calls/messages from users whose telephone numbers are not in the second list 205$b$, are undertaken upon reaching the single threshold TH2.

As another example, users of IMS-capable mobile communications terminals, possibly in addition to receiving the notification from the network, may visualize a current battery charge level condition of other users in terms of, e.g., an icon, or a color of an icon displayed on their terminals, the icon or icon color being determined by a presence server that, based on the information held by the battery status server, manages flags corresponding to the battery charge level condition of the users; by contacting the presence server, a suitable client application running at the IMS terminals of the IMS terminals users may get the information about the battery charge level of other users.

Furthermore, in an alternative embodiment of the invention the trigger for the incoming call/message directed to the mobile communications terminal of a user that has subscribed for the network service is not set at the service subscription, being instead set dynamically by the service logic on the application server at the HLR level, when the network receives the notification of the battery charge level threshold crossing by the mobile communications terminal (the trigger being reset when the battery charge is restored); in this way, the burden on the service logic can be reduced.

The invention claimed is:

1. In a mobile communications system comprising a mobile communications network and a battery-powered mobile communications terminal, a method comprising: receiving, at a mobile communications network apparatus subsystem, a notification of a low battery charge condition from the battery-powered mobile communications terminal of a first user; retrieving, at the mobile communications network apparatus subsystem, a geographic location corresponding to an approximate geographic location of the battery-powered mobile communications terminal at the time of sending the notification; determining a message format of a second user corresponding to a communications terminal of the second user; and sending a first message to the second user in the same message format of the second user, the first message informing the second user of the notification of the low battery charge condition and the retrieved geographic location.

2. The method according to claim 1, wherein sending the first message to the second user comprises having the mobile communications network apparatus subsystem inform the second user if the second user places a call to the battery-powered mobile communications terminal.

3. The method according to claim 1, further comprising managing an incoming communication directed to the battery-powered mobile communications terminal based on the received notification therefrom.

4. The method according to claim 3, wherein managing the incoming communication comprises:
avoiding forwarding the communication to the battery-powered mobile communications terminal if a communication sender is not in an allowed communication sender list.

5. The method according to claim 1, further comprising: providing a notification list of users, wherein informing the second user comprises informing at least one user on the notification list.

6. The method according to claim 1, wherein sending the first message to the second user comprises issuing at least one of a short message service message, a multimedia messaging service message, a voice message, an instant message, and an electronic mail message.

7. The method according to claim 1, further comprising: setting, at the battery-powered mobile communications terminal, at least a first battery charge level threshold and a second battery charge level threshold; receiving as the notification a comparison of a battery charge level to the first and second battery charge level thresholds; and if the battery charge level is lower than the first battery charge level threshold, sending the first message; or if the battery charge level is lower than the second battery charge level threshold, sending a second message to at least the second user.

8. The method according to claim 7, wherein said sending the first message or the second message is performed automatically.

9. The method according to claim 1, wherein said notification comprises at least one of an unstructured supplementary service data message, a short messaging service message, and a presence message.

10. In a mobile communications system comprising a mobile communications network and a battery-powered mobile communications terminal, a method comprising: receiving, at a mobile communications network apparatus subsystem, a notification of a low battery charge condition from the battery-powered mobile communications terminal of a first user; retrieving, at the mobile communications network apparatus subsystem, a geographic location corresponding to an approximate geographic location of the battery-powered mobile communications terminal at the time of sending the notification; informing at least one second user of the notification of the low battery charge condition and the retrieved geographic location; providing a list of users allowed to place calls; checking whether the second user is in the list; in the negative case, avoiding forwarding a call from the second user to thebattery-powered mobile communications terminal; and in the positive case, allowing the second user to choose whether or not to continue with the call to the battery-powered mobile communications terminal, and if the second user chooses not to continue the call, avoiding forwarding the call to the battery-powered mobile communications terminal.

11. The method according to claim 10, wherein said list comprises at least one allowed caller specified by the first user of the mobile communications terminal.

12. The method according to claim 10, wherein said avoiding forwarding the call further comprises forwarding the call to a mailbox associated with the first user.

13. The method according to claim 10, further comprising:
informing the first user of the calls or communications not forwarded to the battery-powered mobile communications terminal during the low battery charge condition.

14. A mobile communications system comprising a mobile communications network apparatus subsystem adapted to:
receive, from a battery-powered mobile communications terminal of a first user, a notification of a low battery charge condition; retrieve a geographic location corresponding to an approximate geographic location of the battery-powered mobile communications terminal at the time of sending the notification; determine a message format of a second user corresponding to a communications terminal of the second user; and send a first message to the second user in the same message format of the second user, the first message configured to inform the second user of the notification of the low battery charge condition and the retrieved geographic location.

15. The mobile communications system according to claim 14, wherein the mobile communications network apparatus subsystem is adapted to send the first message to the second user if the second user places a call to the battery-powered mobile communications terminal.

16. The mobile communications system according to claim 15, wherein the mobile communications network apparatus subsystem is further adapted to manage the call by the second user according to the received notification.

17. The mobile communications system according to claim 14, wherein the mobile communications network apparatus subsystem is further adapted to manage an incoming communication directed to the battery-powered mobile communications terminal based on the received notification therefrom.

18. The mobile communications system according to claim 14, wherein the mobile communications network apparatus subsystem is further adapted to: manage a list of users to be sent the first message informing of the low battery charge condition experienced by the battery-powered mobile communications terminal of the first user, and send to the second user the first message if the second user is in the list.

19. The mobile communications system according to claim 14, wherein the first message to the second user comprises at least one of a short messaging service message, a multimedia messaging service message, a voice message, an instant message, and an electronic mail message.

20. A mobile communications system comprising a mobile communications network apparatus subsystem adapted to:
receive, from a battery-powered mobile communications terminal of a first user, a notification of a low battery charge condition; retrieve a geographic location corresponding to an approximate geographic location of the battery-powered mobile communications terminal at the time of sending the notification; inform at least one second user of the notification of a low battery charge condition and the retrieved geographic location; manage a list of users allowed to place calls to the battery-powered mobile communications terminal; when a call from the second user is placed, check whether the second user placing the call is in the list; if the second user is not in the list, avoid forwarding the call to the battery-powered mobile communications terminal; and if the second user is in the list, allow the second user to choose whether or not to continue with the call to the battery-powered mobile communications terminal, and if the second user chooses not to continue the call, avoid forwarding the call to the battery-powered mobile communications terminal.

21. The mobile communications system according to claim 20, wherein the list comprises at least one allowed caller specified by the first user of the mobile communications terminal.

22. The mobile communications system according to claim 20, wherein the mobile communications network apparatus subsystem is further adapted to forward the call not allowed to be forwarded to the battery-powered mobile communications terminal to a mailbox associated with the first user.

23. The mobile communications system according to claim 20, wherein the mobile communications network apparatus subsystem is further adapted to inform the first user of the communications not forwarded to the battery-powered mobile communications terminal during the low battery charge condition.

* * * * *